United States Patent [19]

Gyugyi et al.

[11] 4,156,176
[45] May 22, 1979

[54] VOLTAGE REGULATOR UTILIZING A STATIC VAR GENERATOR

[75] Inventors: Laszlo Gyugyi, Penn Hills; Michael B. Brennen, Wilkins Township, Allegheny County; Thomas H. Putman, Penn Hills, all of Pa.

[73] Assignee: Electric Power Research Institute, Inc., Palo Alto, Calif.

[21] Appl. No.: 811,795

[22] Filed: Jun. 30, 1977

[51] Int. Cl.² .............................................. H02J 3/18
[52] U.S. Cl. .................................... 323/106; 323/119
[58] Field of Search ................ 323/101, 106, 119, 124

[56] References Cited

U.S. PATENT DOCUMENTS

| 2,652,529 | 9/1953 | Alexanderson | 323/124 X |
|---|---|---|---|
| 3,424,970 | 1/1969 | Ross | 323/106 X |
| 3,450,983 | 6/1969 | Koppelmann et al. | 323/124 X |
| 3,849,677 | 11/1974 | Stacey et al. | 323/124 X |
| 3,942,100 | 3/1976 | Käuferle et al. | 323/119 X |
| 3,987,360 | 10/1976 | Brennen et al. | 323/101 |

*Primary Examiner*—A. D. Pellinen
*Attorney, Agent, or Firm*—M. J. Moran

[57] ABSTRACT

A voltage regulator is taught for maintaning the terminal voltage of a three phase transmission line at a fixed reference value. The voltage regulator system utilizes the inductive reactance of the transmission line in conjunction with reactive current from a VAR generator to compensate for the voltage effect of line current as it flows through the inductive reactance. The VAR generator is of the parallel capacitor-inductor type where the inductor is controlled by a thyristor switch. The firing range for the thyristor switch is determined by a fast acting static control system which utilizes line-to-line voltage and line-to-ground voltage as an input. A signal related to the latter voltages is processed and compared against a reference. The integrated difference thereof is utilized to determine the firing angle for the thyristor switch.

12 Claims, 14 Drawing Figures

VOLTAGE REGULATOR UTILIZING A STATIC VAR GENERATOR

CROSS-REFERENCE TO RELATED APPLICATIONS

The subject matter of this invention is related to other inventions disclosed and claimed in concurrently filed U.S. patent application Ser. No. 811,796, by the same inventors as the present application.

BACKGROUND OF THE INVENTION

1. Field of the Invention

The subject matter of this invention relates generally to voltage regulators for three phase voltage transmission, distribution or utilization lines. The subject matter of this invention relates more particularly to the utilization of controlled static VAR generators for providing voltage regulation.

2. Description of the Prior Art

It is well known to utilize voltage regulators to stabilize the voltage at a particular terminal location on multi-phase electrical transmission, distribution or utility lines. It has been found that a transmission line may be represented by an apparent impedance which may be inductive. A varying load connected to the terminals to be regulated may cause the line current to vary. The varying line current produces a voltage drop across the impedance of the line which vectorially adds to the source voltage thus producing a terminal voltage which may be less than, equal to or greater than the source voltage, depending upon the many things including the effects of other components in the system. This observed phenomena becomes significant as the line current varies because the varying line current changes the voltage drop across the impedance of the line, thus changing the voltage at the terminals which supply power to the load. This characteristic is undesirable in a circuit which is to be regulated. A regulating apparatus may be provided at the terminals to compensate for the changes in the vectorially added source and inductive reactance voltage. It is generally well known that as load impedance decreases line current may become significantly larger, thus introducing a voltage drop in the supply line which subtracts from the terminal voltage of the load. It is undesirable to have load voltage vary in many instances. Consequently, a voltage regulator may be provided proximate to the terminals across which voltage is to be relatively constant. Typical AC regulators are described in the Control Engineers' Handbook edited by J. G. Truxal, 1958, Sections 11.18-11.21. Most popular schemes for voltage regulation utilize rotating synchronous condensers, tap-changing transformers, chokes or autotransformers in conjunction with voltage sensing device. These regulating devices have a number of disadvantages which include lossiness and slow response time. It has recently been found that reactive current can be supplied to or withdrawn from electrical conductors by utilizing a fixed capacitor and thyristor controlled inductor connected in parallel across the lines. The fixed capacitor provides current which leads the voltage across the line by 90° and the thyristor controlled inductor provides current which lags the voltage across the line by 90°. The inductive current is therefore 180° out of phase with the capacitive current. By controlling the firing angle of the thyristor switch which in turn controls the inductor, the amount of reactive current and its phase can be shifted, depending upon the parameters of inductance and capacitance, for example. Such being the case, leading or lagging reactive current may be supplied to the line. This idea has been utilized extensively in the past in the form of VAR (volt amps reactive) generator circuits. These circuits have been utilized for power factor correction and flicker control. Examples of such circuits may be found in U.S. Pat. Nos. 3,987,360, issued Oct. 19, 1976 to M. B. Brennen et al; 3,999,117, issued Dec. 21, 1976 to Gyugyi et al; and 4,000,455, issued Dec. 28, 1976 to Gyugyi et al. These patents teach VAR generation. The conduction angle of the thyristor switch which controls the current flowing through the inductor of the VAR generator is determined by a static control system which is interconnected with the lines to be controlled. It would be advantageous if a VAR generator type circuit with associated control could be utilized in conjunction with polyphase electrical transmission systems to provide regulating voltage. The subject matter of the present invention was at least partially disclosed in a report filed July 2, 1976 for the Electric Power Research Institute, Inc. by L. Gyugyi and W. J. Lordeon, entitled Quarterly Report No. 2, RP 750-1 "Transmission System Static VAR Control."

SUMMARY OF THE INVENTION

In accordance with the invention, a polyphase static VAR generator circuit of the parallel connected fixed capacitor and thyristor controlled inductor type is taught. The VAR generator circuit provides leading or lagging reactive current to the transmission line to compensate for reactive voltage generation in the transmission line due to the flow of line current. The amount of reactive current necessary to provide the compensating effect is determined by a sensing and control system which senses the voltage on each line of a phase to be regulated and which additionally determines the phase-to-phase voltage. The three voltages are weighted appropriately and subtracted from a reference voltage. The difference is supplied to a summing integrator followed by a track and store module to provide a generally fixed output signal which is indicative of the difference between the voltage desired at the terminals to be regulated and the actual voltage thereof over a relatively short period of time. The difference signal is than provided to a firing angle generator for the thyristor or thyristors in question, thus providing sufficient compensating voltage to maintain a relatively high degree of regulation on the desired terminals. It is interesting to note that the provision of leading or lagging reactive current may be used to compensate for voltages in the transmission line which are caused primarily by a resistive component of current flow. Only absolute values of voltage need be compensated for in the present invention as phase shifts are considered relatively unimportant because of expected minor changes therein.

BRIEF DESCRIPTION OF THE DRAWINGS

For a better understanding of the invention, reference may be had to the preferred embodiment thereof shown in the accompanying drawings in which.

DESCRIPTION OF THE PREFERRED EMBODIMENTS

Figure 1:
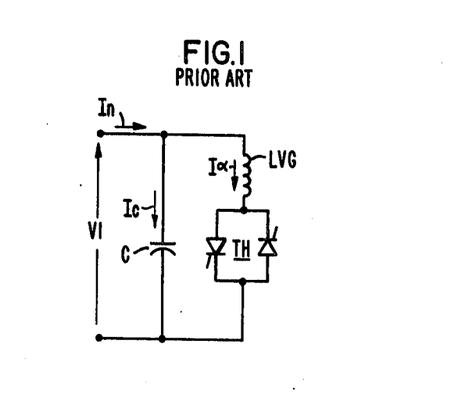
FIG. 1 shows a prior art single phase static VAR generator circuit.

Referring now to the drawings and FIG. 1 in particular, a prior art VAR generator for reactive current supply is shown. A voltage V1 is supplied across a fixed capacitor C and the combination of an inductor LVG and a two-way thyristor switch TH connected in series circuit relationship. It is well known that the capacitive current Ic flowing through the capacitor C as the result of the voltage V1 leads the voltage V1 by 90 electrical degrees. On the other hand, the inductive current I$\alpha$ which flows through the series combination of the inductor LVG and the thyristor switches TH lags the voltage V1 by 90 electrical degrees. Consequently, the inductive current I$\alpha$ and the capacitive current Ic are 180° out-of-phase.

Figure 2:
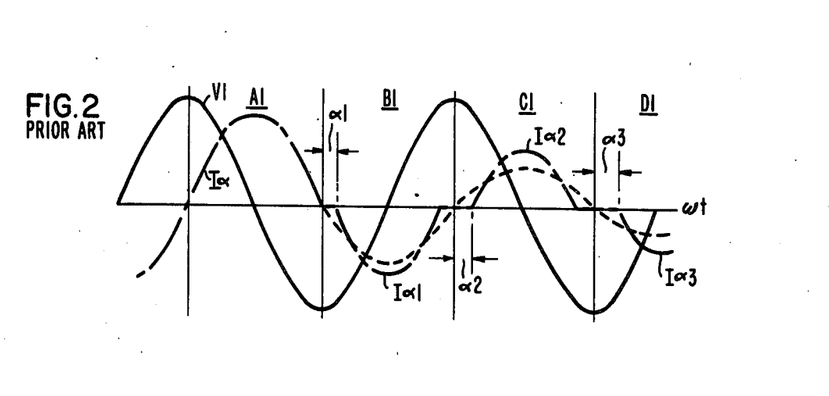
FIG. 2 shows phase back relationships for the generator of FIG. 1.

Referring now to FIG. 2 in conjunction with FIG. 1, the wave shapes of I$\alpha$ as a function of $\omega$t and the voltage V1 as a function of $\omega$t are shown. In particular, it will be noted that as the firing angle $\alpha$ is changed from $\alpha$1 to $\alpha$2 to $\alpha$3, for example, the current flow I$\alpha$2, I$\alpha$2 and I$\alpha$3 respectively in each of the regions B1, C1 and D1 respectively will change. These currents combine in each case with the fixed capacitive current Ic to produce a net current In as shown in FIG. 1. Depending upon the parameters of the VAR generator circuit, net leading or lagging reactive current In can be produced utilizing this apparatus.

Figure 3:
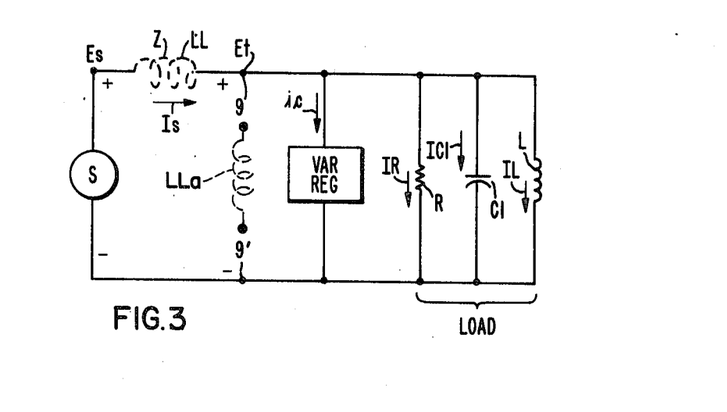
FIG. 3 shows a single phase transmission system utilizing a VAR regulator of the type disclosed in the present invention.
Figure 5:
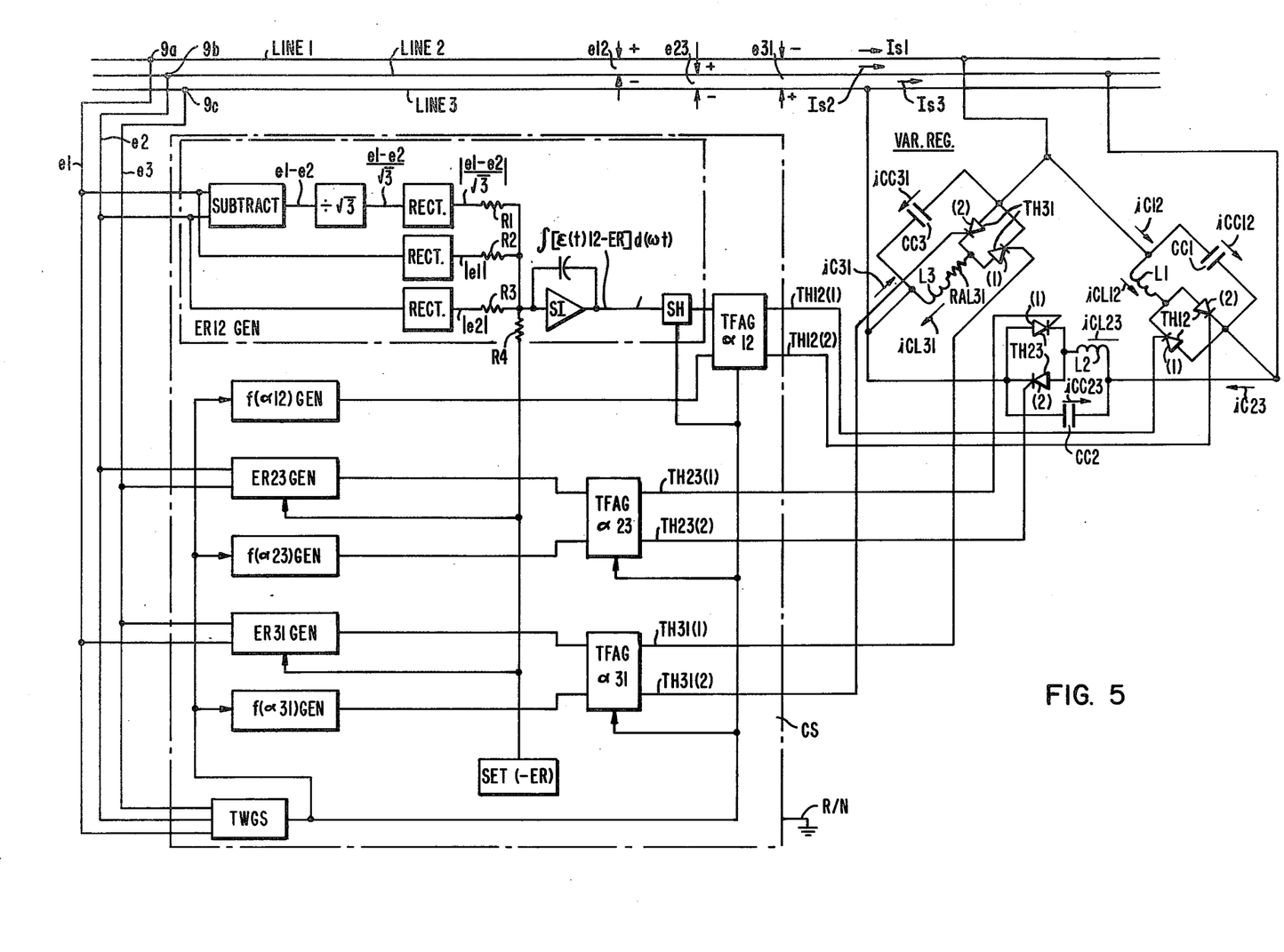
FIG. 5 shows an implemented regulator circuit using the principles of the invention.

Referring now to FIG. 3, a reactive current generating system for regulating a simplified transmission line is shown. In particular, the transmission line includes a source of voltage S which produces an AC generator voltage Es. There is provided in the transmission line an apparent or real series transmission line impedance Z which in this case is presumed to be inductive as represented by the symbol LL for purposes of simplicity of illustration. Alternately or additionally a parallel connected similar impedance LLa may be present. Through this transmission line and the serially connected impedance Z flows source current Is. There is also provided a load LOAD which for purposes of simplicity is shown as parallel connected resistance R, capacitance C1 and inductance L. A VAR regulator VAR REG is provided to compensate for the effects of voltage change at the terminals 9 and 9'. The voltage at these terminals is represented by Et. The compensating current is represented by ic which is analogous to the current In of FIG. 1. The current through the resistive element R is represented by IR, the current through the capacitive element C1 is represented by IC1 and the current through the inductive element L is represented by IL. It is well known that the current that flows through the resistive element R is a linear proportional function of the voltage Et. On the other hand the current which flows through the capacitive element C1 is related to the differential of the voltage Et with respect to $\omega$t while the current which flows through the inductor L is related to the integral of the voltage Et with respect to $\omega$t. Observation of power transmission, distribution or utilization circuits similar to the circuit shown in FIG. 3 has shown that changes in the load LOAD which cause current Is to change have an effect on the terminal voltage Et. In particular, it has been found that the voltage drop across the impedance Z is affected by the current Is flowing therethrough. In particular, a voltage drop is developed across Z as a function of the current Is. This voltage drop vectorially adds to the voltage Es of the source S, thus making the terminal voltage Et different than the source voltage Es. As is well known, a "vectorial addition" sometimes leads to an arithmetic subtraction. The purpose of the VAR regulator VAR REG is to supply compensating current to the impedance Z. Of course it is to be understood that the phrase "supply compensating current" includes the concept of sinking or removing reactive current in addition to adding or giving reactive current if the situation requires. The foregoing indicates that changes in terminal voltages Et can be compensated by utilizing a VAR generator. In order for this to happen, however, a means for controlling the VAR generator must be provided and this means must be interconnected with the line to be regulated so that appropriate control of the VAR regulator can be accomplished. FIG. 5 shows the preferred embodiment of the invention in which the appropriate control and regulation takes place.

Figure 4A:
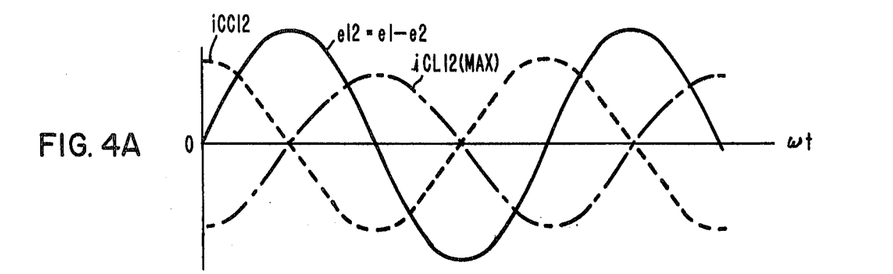
FIG. 4A shows the wave shapes of terminal voltage, capacitor current and inductor current for the circuit of FIG. 5.
Figure 4B:
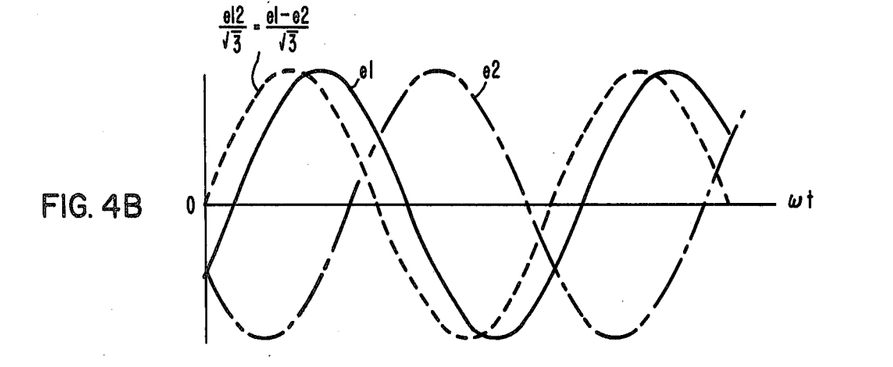
FIG. 4B shows wave shapes of the line-to-line and line-to-ground voltages of the circuit of FIG. 5.
Figure 4C:
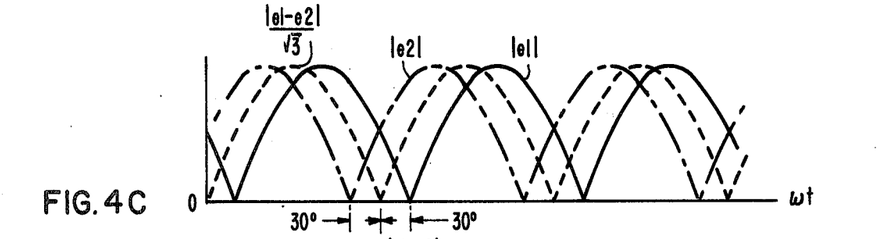
FIG. 4C shows the rectified wave shapes of the voltages shown in FIG. 4B.
Figure 4D:
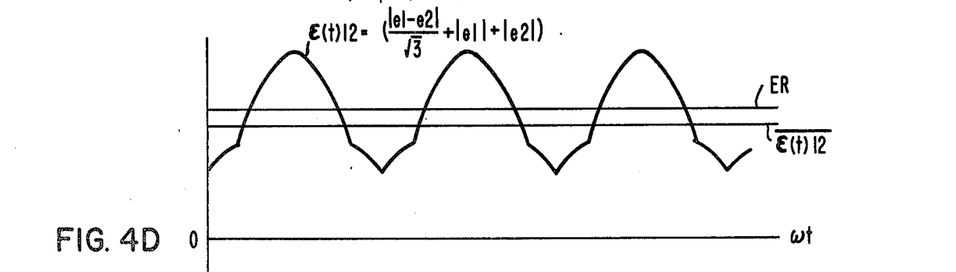
FIG. 4D shows the sum of the wave shapes of FIG. 4C and the reference voltage.

To understand the operation of of the apparatus of FIG. 5, FIGS. 4A-4J are to be referred to in conjunction therewith. FIG. 4A shows the interrelationship of the phase voltage e12 across an arbitrarily chosen phase of the apparatus of FIG. 5 as a function of $\omega$t. This is done for purposes of illustration and is not limiting. In particular, the phase voltage e12 which is equal to the phase-to-ground voltage e1 minus the phase-to-ground voltage e2 is shown as a phase reference. The fixed component of capacitor current iCC12 is shown in FIG. 4A as leading the voltage e12 by 90°. Likewise, the presumed maximum inductive current iCL12 (MAX) is shown lagging the voltage by 90°. Since the inductive current iCL12 (MAX) has been chosen for variation to achieve regulation, the firing angle for the thyristor in each half cycle of the voltage wave e12 must correspond to the first 90° of the current wave iCL12 (MAX). It has been found that control of the firing angle $\alpha$ for the thyristors of FIG. 5 can be optimized by summing certain voltage values. To obtain regulation a reference voltage of value ER shown in FIG. 4D, and in the control system CS of FIG. 5, is set either mechanically or electrically at the outset. Some function of the actual line voltage $\epsilon$(t)12 is then compared against this reference voltage to determine if correction is necessary. The derivation of the representative voltage $\epsilon(t)12$ is depicted in FIGS. 4B-14D in terms of wave shapes, and in the control system CS of FIG. 5 in terms of functional blocks. In particular, the voltage-to-neutral or voltage-to-ground e1 of line 1 and the voltage-to-neutral e2 of line 2 are subtracted to provide a difference $e_{12}=e_1-e_2$. This is then divided by the square root of 3 as a weighing factor. This is done in recognition of the fact that the voltage between phase lines of a balanced power line system is different from the phase-to-ground voltage by the factor of the square root of 3. This voltage is then rectified and supplied as one input to a summing integrator SI shown in FIG. 5. In a like manner the voltage-to-neutral e1 and the voltage-to-neutral e2 are both rectified and supplied as separate and independent inputs to the summing integrator SI. Finally, the value $-ER$ is also supplied to the summing integrator SI. Referring again to FIGS. 4B-4D, the derivation of a signal representative of the actual phase voltage is clearly set forth. FIG. 4C shows the effect of rectification in which it appears that all of the appropriate voltages are thirty (30) electrical degrees displaced from each other. The signals of FIG. 4C are added to each other to form the function $\epsilon(t)12$ shown in FIG. 4D. The addition is represented by equation (1) below:

$$\epsilon(t)12 = 1/\sqrt{3}|e1-e2| + |e1| + |e2| \tag{1}$$

Appropriate signals for $\epsilon(t)23$ and $\epsilon(t)31$ are shown below in equations (2) and (3) respectively:

$$\epsilon(t)23 = 1/\sqrt{3}|e2-e3| + |e2| + |e3| \tag{2}$$

$$\epsilon(t)31 = 1/\sqrt{3}|e3-e1| + |e3| + |e1| \tag{3}$$

Figure 4E:
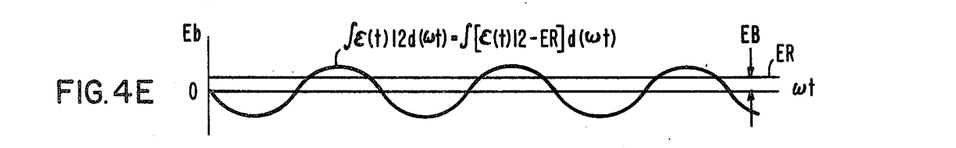
FIG. 4E shows the wave shape of FIG. 4D after summation and integration.
Figure 4F:
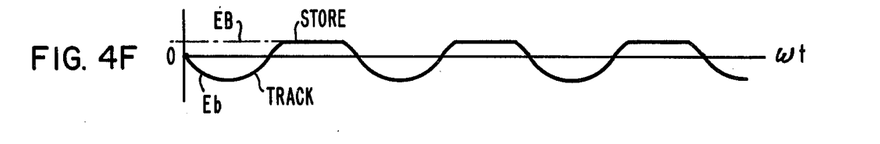
FIG. 4F shows the track and store wave shape of the waves of FIG. 4E.
Figure 4G:
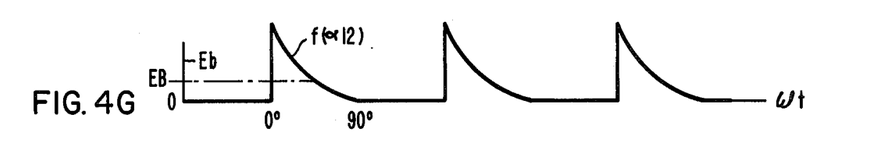
FIG. 4G shows a f($\alpha$) wave shape.
Figure 4H:
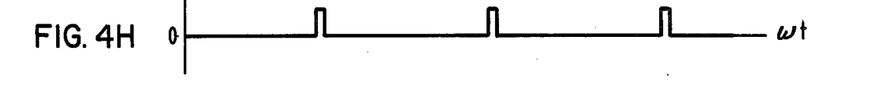
FIG. 4H shows timing pulses for $\alpha$.
Figure 4I:
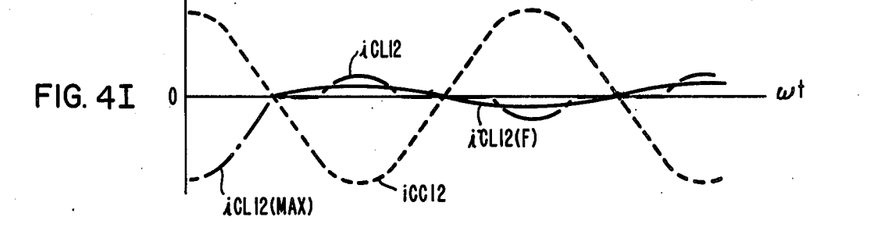
FIG. 4I shows the wave shapes of the phase backed component of inductive current, its fundamental component, and the capacitive current for the apparatus of FIG. 5.
Figure 4J:
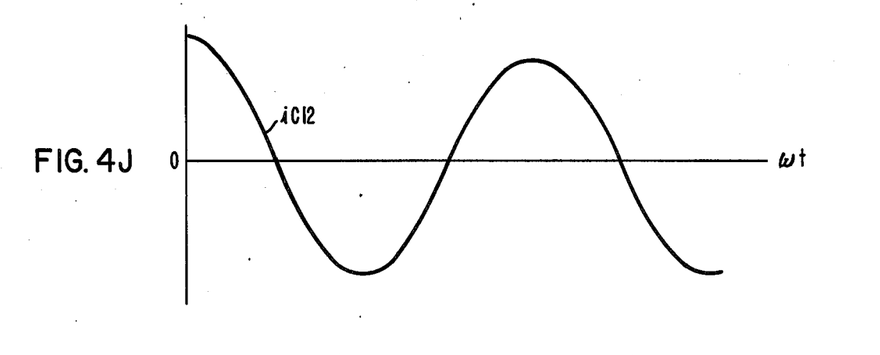
FIG. 4J shows the sum of the currents of FIG. 4I.

With regard to $\epsilon(t)12$, the resultant wave shape contains a second harmonic of the fundamental of the voltage wave shape e12 shown in FIG. 4A. Consequently, it repeats itself twice for every one cycle of the voltage e12 of FIG. 4A. FIG. 4D shows the average value $\overline{\epsilon(t)12}$ for this wave shape and shows its relationship to the reference voltage ER. A summing integrator SI which will be described more fully hereinafter is utilized to provide the output shown in FIG. 4E. The difference between the desired or reference value ER and the average value of $\epsilon(t)12$ is shown as EB. The integrated difference between the reference ER and $\epsilon(t)12$ still contains the second harmonic of the voltage e12 of FIG. 4A. It should be noted that the latter signal is used as an intermediate step to derive thyristor firing angle signals for the thyristors of the VAR regulator of FIG. 5. It should be pointed out that the correct signal level for the thyristor firing angle control TFAG also shown in FIG. 5 need not be available at all times. This follows from the fact that one of the two thyristors connected to inductor L1 of FIG. 5 is fired every half cycle of the voltage wave e12, for example, and possible firing angles exist only during the quarter cycle prior to voltage zero. The output wave Eb of the summing integrator SI which is represented by the wave shape of FIG. 4E carries the firing angle information, but it need only be correct during the appropriate quarter cycle as was described previously. Since the output Eb is comprised of a constant value EB plus the previously mentioned second harmonic of voltage e12 as illustrated in FIG. 4E, if the signal is sampled at the beginning of each of the possible firing intervals and the sampled value EB is then applied to the thyristor firing angle generator TFAG of FIG. 5, correct firing angles $\epsilon$ will result. It is important to remember that if a signal is sampled every half cycle it is impossible to detect the presence of the second or even harmonics of that signal. Consequently, the signal of FIG. 4E is sampled once every half cycle of the voltage e12 of FIG. 4A and stored during the appropriate firing interval. This is shown in FIG. 4F. Concurrent with this, a function of generator, $f(\alpha)$ generator, identified for example as $f(\alpha 12)$ GEN in FIG. 5, provides a decaying exponential-like signal during the appropriate half cycles. When this signal reaches the value of the stored error signal EB, the thyristor firing angle generator TFAG$\alpha 12$ provides an output pulse to the appropriate thyristor thus causing firing of the thyristor. The wave shape of the function of $\alpha$ generator is shown in FIG. 4G and appropriate related firing angle pulses are shown in FIG. 4H. The effect of the firing angle pulses of FIG. 4H is to control the amount of current flowing through the inductor L1 of FIG. 5, for example. As is shown in FIG. 4I, this may reduce the current iCL12 (MAX) to a sufficient value iCL12 to generate a first harmonic iCL12(F) to cooperate with the fixed capacitor current iCC12 to provide the net phase reactive output current iC12, shown in FIG. 4J.

Referring now more specifically to FIG. 5, the construction and operation of a VAR generator regulator for a three phase electrical system is set forth in detail. Line-to-ground voltages e1, e2 and e3 exist for each of the three lines, LINE 1, LINE 2 and LINE 3 shown in FIG. 5. The currents that flow in the lines, LINE 1-LINE 3, are identified as Is1, Is2 and Is3 respectively. The line-to-line voltage is identified as e12, e23 and e31 for each of the three phases. Terminals are shown interconnected with the transmission line at the points 9a, 9b and 9c at which the terminal voltages previously described exist. These voltages are supplied to a control system CS for a VAR regulator VAR REG. An appropriate VAR regulator is described in detail in previously described U.S. Pat. Nos. 3,999,117; 3,987,360 and 4,000,455. Basically, it comprises three fixed capacitors CC1-CC3 and three parallel connected inductors L1, L2 and L3 respectively. Each of the inductors has a bidirectional thyristor switch TH12, TH23 and TH31, respectively, which allows the amount of inductor current to be controlled by signals on the gates of the switches. The six lines which represent the gates of the thyristor switches are interconnected to the control system CS at the outputs of three thyristor firing angle generators TFAG $\alpha 12$, TFAG $\alpha 23$ and TFAG $\alpha 31$. Each of the latter thyristor firing angle generators may be controlled in its action by a timing wave shape generator TWGS, such as but not limited to the type described in detail in U.S. Pat. No. 3,987,360. The control system CS comprises an error generator for each of the thyristor firing angle generators and a function of $\alpha$ generator $f(\alpha)$ GEN for each of the thyristor firing angle generators. As an example, thyristor firing angle generator TFAG $\alpha 12$ is fed by an error generator ER12 GEN and a function of $\alpha$ generator $f(\alpha 12)$ GEN. In the same manner, TFAG $\alpha 23$ is fed by the ER23 GEN and the $f(\alpha 23)$ GEN. And TFAG $\alpha 31$ is fed by ER31 GEN and the $f(\alpha 31)$ GEN. The error generators and the function of $\alpha$ generators may be controlled by signals from the timing wave shape TWGS generator previously described. A means for setting a desired value for voltage is provided in the form of a SET($-ER$) functional block. The signal $-ER$ is fed to each of the error generators ER12 GEN, ER23 GEN and ER31 GEN. Each of the function of α generators provides an output signal similar to the signal f(α12) shown in FIG. 4G. This signal is provided during the appropriate quarter cycle of voltage, e12 for example, for determining the firing angles α of the appropriate thyristors. Consequently, it can be seen that the thyristor firing angle generator TFAG α12 is fed by the f(α12) signal and so on. The outputs of the thyristor firing angle generator TFAG α12 are the signals TH12(1) and TH12(2). Similar signals are provided by the thyristor firing angle generator TFAG α23 and the thyristor firing angle generator TFAG α31. These signals are routed to the appropriate thyristors where inductive current control is implemented. For purposes of simplicity of illustration, only the error generator ER12 GEN is depicted and described in its functional block diagram form in its entirety. The other two error generators are similar and are consequently not shown nor described in their entirety for simplicity. By way of illustrative example, the input signals for the error generator ER12 GEN are the line-to-ground voltages e1 and e2, respectively. These voltages are subtracted one from the other, divided by the square root of 3, rectified to provide the absolute value and routed by way of a summing integrator input resistor R1 to the summing integrator SI. The signal e1 is also provided to a rectifier and routed from that apparatus to the summing integrator SI by way of resistor R2. Finally the signal e2 is rectified and routed by way of resistor R3 to the summing integrator SI. Resistor R4 is utilized to provide the signal −ER to the summing integrator so that the function $\epsilon(t)12$ −ER can be formed and integrated with respect to ωt. The output signal from the summing integrator SI is supplied to sample and hold devices SH, the output of which is level EB for a period of time. Level EB is provided as one input to the thyristor firing angle generator TFAG α12. The other input thereof is the output of the function of α12 generator f(α12) as depicted in FIG. 4G. The thyristor firing angle generator TFAG α12 performs essentially a comparator function, and when the signal EB equals or exceeds the f(α12), as is shown in FIGS. 4F and 4G respectively, the firing pulses of FIG. 4H are generated. In this case, appropriate thyristors TH12(1) and TH12(2) are fired to aid in providing a sufficient amount of compensating current to accomplished the aforementioned regulating purpose. As a result of setting the error value ER, the load LOAD sees relatively equal and stationary voltages at the terminals 9a, 9b and 9c, regardless of internal current variations in the LOAD or generation voltage levels and regardless of the effect that the current changes have on the transmission line impedance.

It is to be understood with respect to the embodiments of this invention that they are not limited to single phase or three phase operation and may be used on any form of polyphase or single phase electrical apparatus. The inherent characteristics of the LOAD are relatively unimportant and the specific VAR generator system is not limiting. In addition, the means for subtracting, rectifying and weighing the various input signals for the control system CS are not limiting. The presence of the rectified signals e1 and e2 in the aforementioned illustrative examples are provided mainly to assist in reducing the effect of the second harmonic on the error signal. The thyristor firing angle generators, TFAG12 for example, may be of any acceptable kind and is not limited to those described in previous patent applications.

The same may be said for the function of α generators shown in FIG. 5. It is also to be understood that it is envisioned that the line voltages are balanced but if such is not the case, three separate values of ER may be provided to the control system CS rather than one value. It is also to be understood that although transmission line apparent inductance may be the impedance which most affects regulation, capacitive effects and resistive effects can be corrected also. It is also to be understood that although VAR generator circuits of the type described herein may operate on a half cycle by half cycle basis, that is not a requirement in a system of the type described herein. Furthermore, the setting of the ER value as shown in the control system CS of FIG. 5 provides a way for changing voltage values utilizing the VAR regulating technique. The direction on various current arrows in the figures is not limiting.

The apparatus taught with respect to the embodiments of this invention have many advantages. One advantage lies in the fact that effective regulation may be implemented by utilizing static VAR regulating techniques which provide compensating reactive current with fast response rather than utilizing slowly responding electrical and mechanical control systems such as are often found in the prior art. Another advantage lies in the fact that the effect of resistive load current can be compensated for by the utilization of reactive current. A significant advantage lies in the fact that a novel apparatus for deriving and processing an error signal to accomplish relatively fast regulation and the balancing of network terminal voltages by the utilization of a VAR generator has been discovered. Another advantage lies in the fact that the utilization of the sample and hold technique described with respect to the embodiment of FIG. 5 eliminates problems inherent with the generation of second harmonic signals. These problems could cause variations in the regulating characteristics of the circuit if appropriate sample and hold techniques were not utilized.

We claim:

1. A voltage regulator for an alternating current electrical system which supplies electrical power to a pair of terminals wherein said electrical system has a reactive element disposed in series circuit relationship with one of said terminals, said reactive element effecting the voltage at said terminals as a function of the amount of current flowing through said reactive element, comprising:

(a) reference means for fixing a reference voltage for said terminals;

(b) determining means for measuring the actual voltage between said terminals at a given time, and for measuring each voltage between a terminal and neutral at said time, and for providing a determinining means output signal related to all said latter determined voltages;

(c) comparator means interconnected with said reference means and said determining means for comparing said reference voltage with said determining means output signal and for providing a comparator means output signal related to the difference therebetween; and (d) reactive current source means interconnected in circuit relationship with said comparator means and said reactive element to provide in response to said comparator means output signal compensating reactive electrical current to said terminals of sufficient magnitude and direction to change the amount of said current flowing through said reactive element to a value which causes the difference between said actual voltage and said reference voltage to be generally zero.

2. A voltage regulator for an alternating current electrical system which supplies electrical power to a pair of terminals wherein reactance exist between said terminals, said reactance effecting the voltage at said terminals as a function of the amount of reactive current flowing through said reactance, comprising:

(a) reference means for fixing a reference voltage for said terminals;

(b) determining means for measuring the actual voltage between said terminals at a given time, and for measuring each voltage between a terminal and neutral at said time, and for providing a determining means output signal related to all said latter determined voltages;

(c) comparator means interconnected with said reference means and said determining means for comparing said reference voltage with said determining means output signal and for providing a comparator means output signal related to the difference therebetween; and (d) reactive current source means interconnected in circuit relationship with said comparator means and said reactance to provide in response to said comparator means output signal compensating reactive electrical current to said terminals of sufficient magnitude and direction to change the amount of said current flowing through said reactance to a value which causes the difference between said actual voltage and said reference voltage to be generally zero.

3. A voltage regulator for a two conductor alternating current electrical system of the type which has a reactance apparatus connected in series with one of the conductors, where each conductor has a voltage value relative to a given voltage potential at any instant of time and where the reactive voltage across the reactance apparatus is a function of the magnitude of the electrical current flowing through the reactance apparatus, comprising:

(a) reference means for setting a desired voltage value between said conductors;

(b) determining means for sensing the actual voltage between said conductors at any instant of time, and for measuring each voltage between a one of said conductors and neutral at said time, and for providing a determining means output signal related to all said latter determined voltages;

(c) comparator means interconnected with said reference means and said determining means for comparing said desired voltage value with said determining means output signal and for providing a comparator means output signal related to the difference therebetween; and (d) reactive current source means interconnected with said comparator means and said electrical system for responding to said comparator means output signal for providing reactive electrical current to said electrical system of sufficient magnitude and direction to change the voltage across said reactance apparatus to a value which causes the difference between said desired voltage value and said actual voltage to be generally zero.

4. A voltage regulator for a two conductor alternating current electrical system of the type which has a reactance apparatus connected between the conductors, where each conductor has a voltage value relative to a given voltage potential at any instant of time and where the reactive voltage across the reactance apparatus is a function of the magnitude of electrical current flowing through the reactance apparatus, comprising:

(a) reference means for setting a desired voltage value between said conductors;

(b) determining means for sensing the actual voltage between said conductors at any instant of time, and for measuring each voltage between a one of said conductors and neutral at said time, and for providing a determining means output signal related to all said latter determined voltages;

(c) comparator means interconnected with said reference means and said determining means for comparing said desired voltage value with said determining means output signal and for providing a comparator means output signal related to the difference therebetween; and (d) reactive current source means interconnected with said comparator means and said electrical system for responding to said comparator means output signal for providing reactive electrical current to said electrical system of sufficient magnitude and direction to change the voltage across said reactance apparatus to a value which causes the difference between said desired voltage value and said actual voltage to be generally zero.

5. A voltage regulator for a two conductor alternating current electrical transmission system of the type which supplies power to a pair of terminals, where the net reactance of the line between a source of power and the terminals appears to be an inductance connected in series with at least one of the conductors, where each conductor has a voltage value relative to neutral at any instant of time and where the net voltage across the apparent inductance is a function of the magnitude of current flowing through the inductance, comprising:

(a) reference means for setting a desired voltage value between said terminals;

(b) determining means for sensing the actual voltage between said terminals at any instant of time, and for measuring each voltage between a terminal and neutral at said time, and for providing a determining means output signal related to all said latter determined voltages;

(c) comparator means interconnected with said reference means and said determining means for comparing said desired voltage value with said determining means output signal and for providing a comparator means output signal related to the difference therebetween; and (d) reactive current source means interconnected with said comparator means and said conductors for responding to said comparator means output signal for providing reactive electrical current to said conductors of sufficient magnitude and direction to change the voltage across said apparent inductor to a value which causes the difference between said desired voltage value and said actual voltage at said terminal to be generally zero.

6. The combination as claimed in claim 5 wherein said two conductors are part of a polyphase electrical system.

7. The combination as claimed in claim 6 wherein said polyphase electrical system comprises a three phase electrical system.

8. The combination as claimed in claim 7 wherein said actual voltage between said terminals and said voltages between said conductors and neutral are all determined, rectified and added one to the other at said instant of time.

9. The combination as claimed in claim 8 wherein said added, rectified voltages are integrated to provide said determining means output signal.

10. The combination as claimed in claim 9 wherein said determining means output signal is stored as a level for a period of time.

11. The combination as claimed in claim 10 wherein said reactive current source means includes a thyristor controlled inductor connected in parallel with a fixed capacitor between said conductors to provide said reactive current as a function of the firing angle of said thyristor, where said thyristor firing angle is a function of said stored level.

12. The combination as claimed in claim 11 wherein said two conductors are part of a three phase electrical system.

* * * * *